United States Patent
Cucchi et al.

[11] Patent Number: 5,845,604
[45] Date of Patent: Dec. 8, 1998

[54] BASIN FOR WASHING AND DRYING PETS

[76] Inventors: Massimo Cucchi, Via Achille Grandi 1, Albinea, Italy, 48020; Oscar Ripamonti, Via D.C. Cazzaniga 9, Merate, Italy, 22055; Ivo Zapparoli, Via F. Parri 2, Carpi, Italy, 41012

[21] Appl. No.: 702,500
[22] PCT Filed: Feb. 13, 1995
[86] PCT No.: PCT/IT95/00017
  § 371 Date: Aug. 21, 1996
  § 102(e) Date: Aug. 21, 1996
[87] PCT Pub. No.: WO95/22248
  PCT Pub. Date: Aug. 24, 1995

[30] Foreign Application Priority Data

Feb. 21, 1994 [IT] Italy .................................. M094A0019
Feb. 21, 1994 [IT] Italy .................................. M094A0020

[51] Int. Cl.$^6$ .................................................. A01K 13/00
[52] U.S. Cl. ............................................ 119/673; 119/677
[58] Field of Search .................................. 119/673, 676, 119/678, 753, 756, 677

[56] References Cited

U.S. PATENT DOCUMENTS

| | | | |
|---|---|---|---|
| 4,194,262 | 3/1980 | Finley et al. | 15/314 |
| 4,549,502 | 10/1985 | Namdari | 119/664 |
| 4,730,576 | 3/1988 | Yoshikawa | 119/671 |
| 4,836,144 | 6/1989 | Cole | 119/665 |
| 4,930,453 | 6/1990 | Laliberte | 119/671 |
| 5,435,269 | 7/1995 | Chen | 119/673 |
| 5,513,598 | 5/1996 | Zapparoli | 119/673 |
| 5,662,069 | 9/1997 | Smith | 119/665 |
| 5,711,252 | 1/1998 | Brandolino | 119/673 |

FOREIGN PATENT DOCUMENTS

| | | |
|---|---|---|
| 2 625 070 | 6/1989 | France . |
| 2 638 319 | 5/1990 | France . |
| 291735 A | 11/1989 | Japan . |
| 291736 A | 11/1989 | Japan . |
| 291737 A | 11/1989 | Japan . |
| 2 270 456 | 3/1994 | United Kingdom . |
| WO 93/06719 | 4/1993 | WIPO . |

*Primary Examiner*—Edgar Burr
*Assistant Examiner*—Leslie Grohusky
*Attorney, Agent, or Firm*—Stroock & Stroock & Lavan LLP

[57] ABSTRACT

A basin for washing, rinsing and drying pets comprises a basin body and a basin support. The basin body includes a flat basin bottom, side walls, a front wall and a rear wall. A portion of the front wall is removable from the basin body, and a connecting area between said front, rear and side walls and said flat basin bottom is formed with a narrow rounded cross sectional shape. The basin support includes a device for sucking water from the animal's fur, a device for drying the animal's fur, a well for discharging liquids, a separator means located either inside the well or downstream of the well for separating toxic liquid from non-toxic liquids.

4 Claims, 5 Drawing Sheets

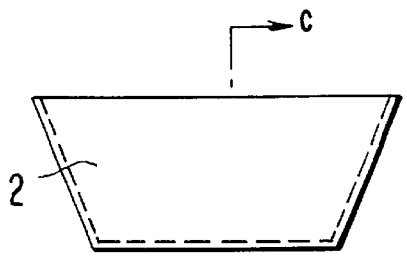
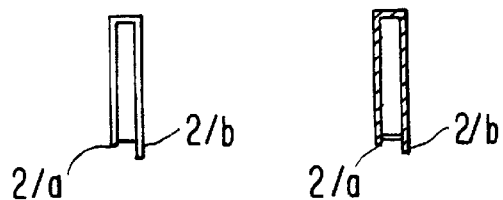
FIG.9  FIG.10  FIG.11
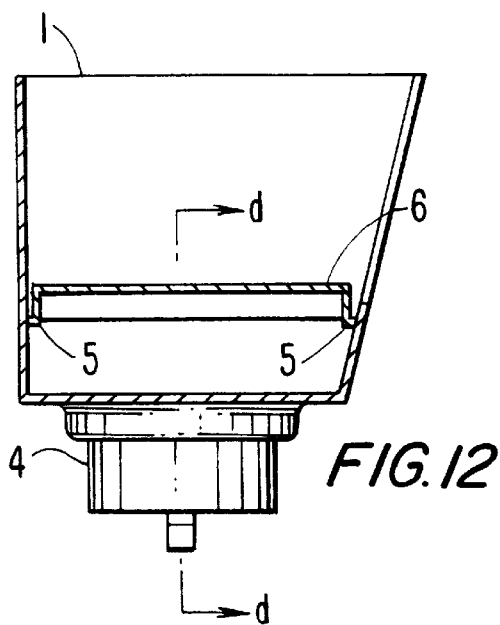
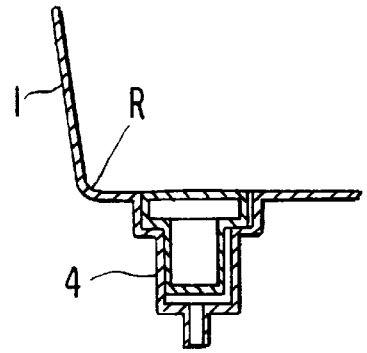
FIG.12  FIG.13
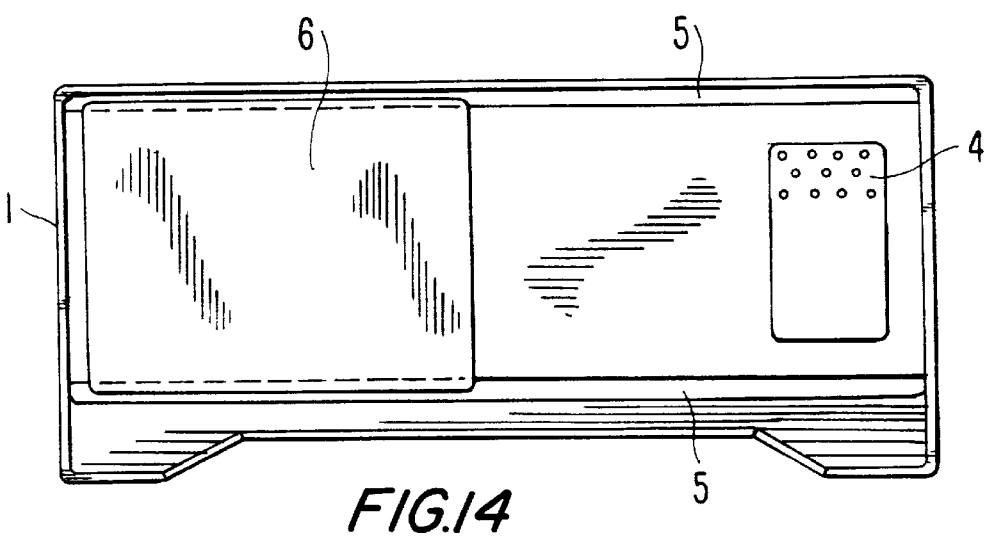
FIG.14

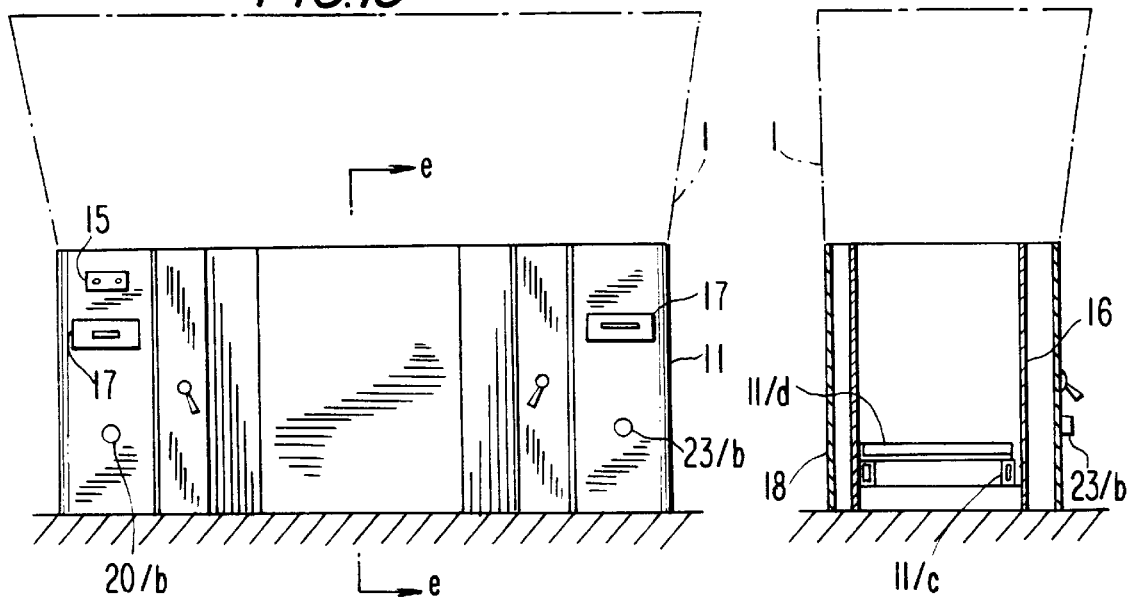
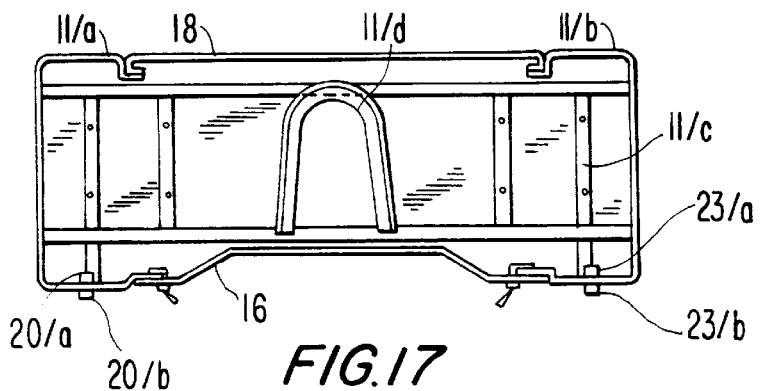
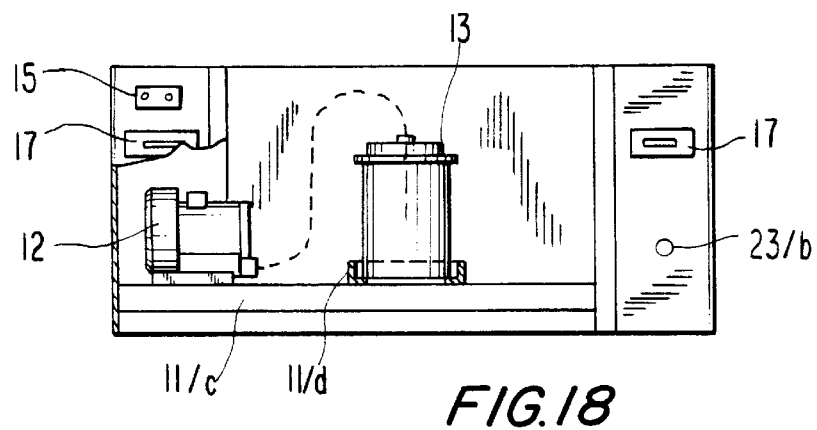

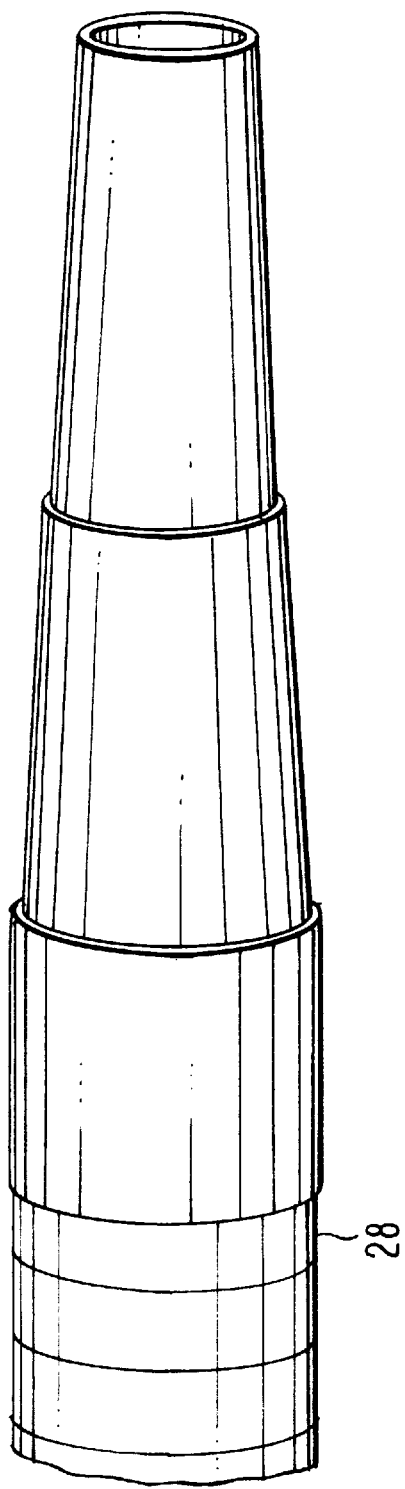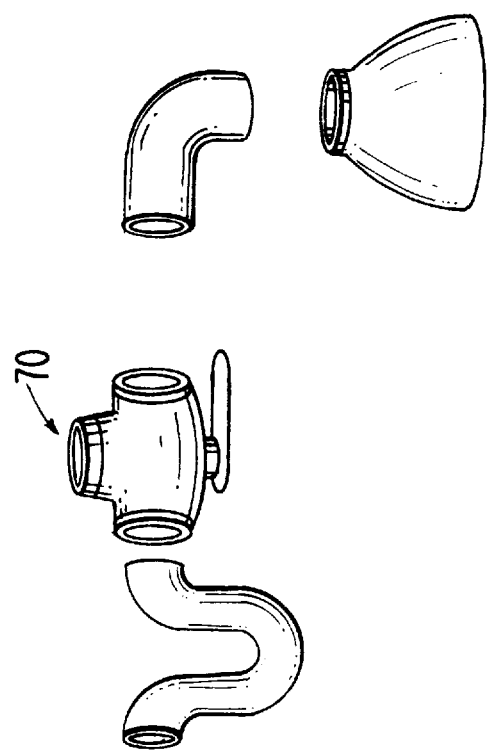

BASIN FOR WASHING AND DRYING PETS

TECHNICAL FIELD

The present invention relates to a basin provided with a basin support (pedestal), and more particularly, to a basin to be used in shops or rooms for the hygenic care of animals, in order to wash and dry dogs, cats or other animals.

BACKGROUND ART

The basins used nowadays in rooms for the care of animals, are usually tubs for humans, connected to the wall at a required height, so as to let them become functional for the operator who has to wash the animal (a dog, a cat, etc.) inside them. As known, the procedure used today for washing or drying an animal, consists of:

washing and rinsing the animal inside the basin;
removing the animal from the basin, placing it on a bracket or a table;
removing as much water as possible from the animal, using towels and/or buckskin;
completing the drying by means of a dryer incorporating electric resistance and being of an industrial kind.

All this results in:

waste of time (the towels and/or buckskin remove only 70% to 80% of the water; afterwards they must be washed and dried on their turn in order to be reused);
waste of energy and lack of hygiene (industrial dryers use 3000 to 4000 Watts; they cause air ionization;
they spread hair and dead parasites into the environment which are not removed by the towels; usually they comprise materials giving rise to cancer, such as asbestos, etc.; the drying time is considerable, since the water quantity which has remained on the animal is elevated);
the configuration and the characteristic features of the basins are not adequate for this particular application, i.e. washing of the animals (dogs slip inside the basin).

FR- 2,625,070 discloses a basin with water re-circulation and filtration, and with a shower hose.

DISCLOSURE OF INVENTION

The object of the present invention is that of eliminating all the drawbacks which have been mentioned above, by realizing a basin provided with a basin support containing devices for sucking water, hair and dead parasites from the animal, and for producing hot air under pressure in order to complete the drying operation. All this is accomplished so as to allow to completely wash, rinse and dry the animal inside the basin, eliminating the use of towels, and meanwhile taking account of the hygienic and sanitary standards which are required by the relevant laws.

According to the present invention, these objects are attained by means of a basin provided with a basin support, having one or more of the following features, it facilitates introduction and removal of the animal to and from the basin;
it facilitates drying of the animal;
it is provided with a sump (well) for collecting and discharging liquids, containing a removable grating for collecting hair and other solid impurities;
it is provided, on the discharge duct, with a three-way valve, allowing to separate polluted liquids from non-polluted ones;
it allows the introduction inside the basin, of panels in different heights, in order to facilitate washing and drying of small animals;
it is provided, inside the basin support, with:
a) a rotary centrifugal compressor (or multistage centrifugal blower), which:
1) at one end generates a vacuum in order to suck liquids and other materials, through an appropriate hose and a connecting tube;
2) and, at the other end, transmits kinetic and compression energy to the air, in order to heat it up and convey it towards a utilization circuit, acting as a "hair dryer".
b) A tank for collecting and retaining water, hair, etc. By using the above arrangement, the compressor will consume an electric power of only 1100 Watt.

BRIEF DESCRIPTION OF DRAWINGS

The features of the invention and its advantages will be more clearly understood by reading the following detailed description referring to the annexed drawings and given only for illustrative and non-limitative purposes, whereby:

FIG. 9 is a front view of the removable front wall portion of the basin;

FIG. 10 shows the side view of the removable front wall portion of FIG. 9;

FIG. 11 is a cross section view taken along the line by c—c of FIG. 9;

FIG. 12 is a cross section view identical of the basin according to the invention;

FIG. 13 is a longitudinal cross sectional view taken along the lines d—d in FIG. 12;

FIG. 14 is a top plan view of FIG. 3;

FIG. 15 is a front elevational view of the basin support;

FIG. 16 is a transversal cross section taken along the plane e—e of FIG. 15;

FIG. 17 is a top plan view of FIG. 15;

FIG. 18 is a front elevational view of the basin of FIG. 1, like FIG. 1, wherein the front closure door is omitted, and the centrifugal compressor and the tank are made visible;

FIG. 20 shows a perspective view of a frusto-conical hose employed in the present invention; and FIG. 21 shows an exploded elevational view of a three way valve constructed in accordance with the invention.

PREFERRED EMBODIMENT OF THE INVENTION

In the figures, the same alpha-numeric references designate the same parts or elements.

Figure 1:
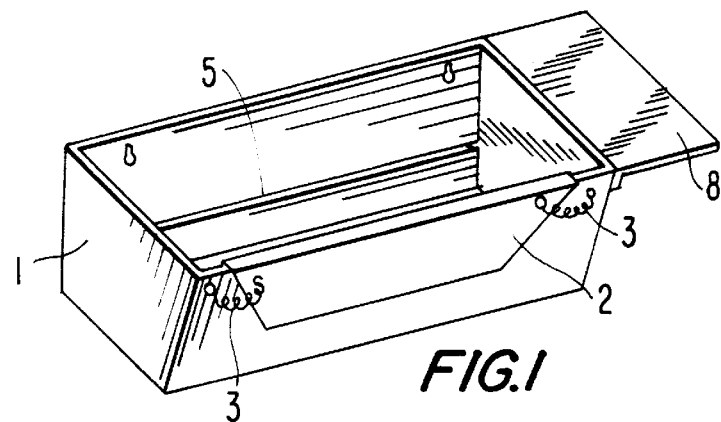
FIG. 1 schematically shows a perspective view of the basin of the present invention.
Figure 2:
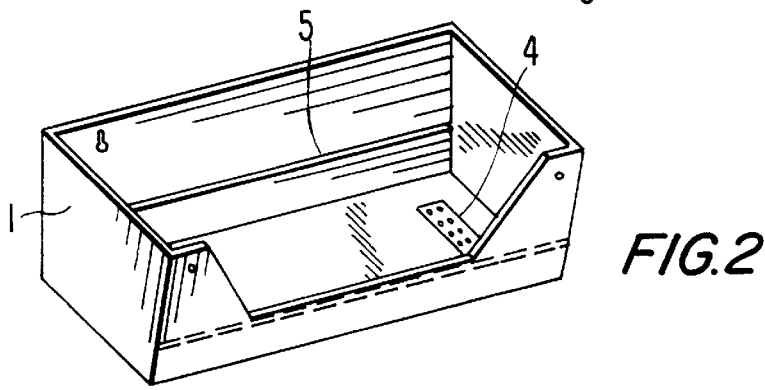
FIG. 2 shows a perspective view of the basin of FIG. 1, without the removable front wall portion.
Figure 3:
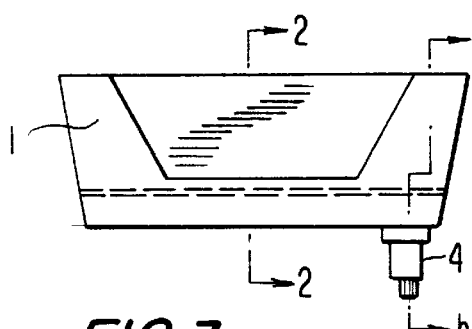
FIG. 3 shows the same basin, according to a front view of the basin of FIG. 1, without the removable front wall portion.
Figure 4:
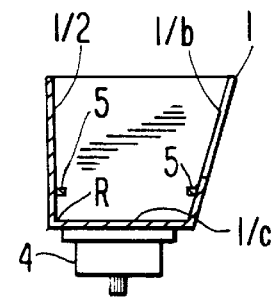
FIGS. 4 and 5 are cross sectional views which are respectively taken along the lines a—a and b—b in FIG. 3.
Figure 5:
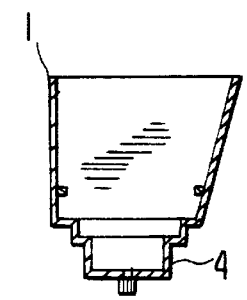

With reference to FIGS. 1 and 2, the number 1 indicates the body of the basin, 2 the removable wall portion—which is connected by chains 3 to the basin body -, and 4 the sump or well through which water is discharged.

Figure 6:
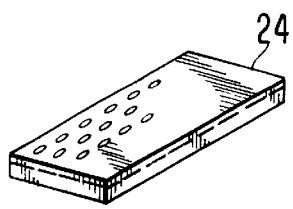
FIG. 6 is a perspective view of the closure grating of the sump (well)
Figure 7:
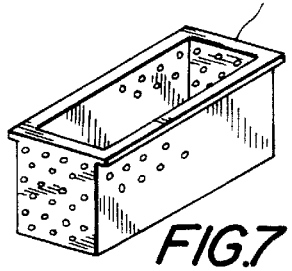
FIG. 7 is a perspective view of the small filtration basket to be inserted inside the sump chamber.

A basin for washing dogs and/or other animals, does not need to be filled with water or to contain a minimal quantity of it; since the animal has to be wetted or soaked, rubbed with shampoo, and rinsed; water must be able to flow directly to the discharge duct without accumulating itself on the bottom of the basin. Therefore, the basin of the present invention differs from known basins (consisting of a simple vessel provided with a water discharge hole) in that it has the following features;

a connecting area between the walls and the basin bottom having narrow rounded cross sectional shape (FIGS. 4, 5, 12, 13), for preventing the animal to slip (as happens with conventional basins). A wall 1/a, which contacts the room's wall, is straight and vertical; the front wall 1/b is slanted towards the operator away from wall 1/a; the basin's bottom 1/c is flat; the curved regions R between basins bottom 1/c and walls 1/a, 1/b have a tight radius forming an angle;

Basin 1 is provided with a sump or well 4 (in the form of an insert or an integral part) in order to discharge the liquids (no known basin has a sump), this sump having a pierced closure grating 24 (FIG. 6). Inside the sump chamber either of the following may be inserted:

a small filtration basket 25 (FIG. 7), which is used for retaining the hair and other solid impurities;

a small vessel 26 (FIG. 8) (instead of the small basket 25, FIG. 7), in order to retain the liquid, when using parasites killing substances. This liquid, after having been filled in appropriate containers, will be brought to plants for disposal of toxic products;

Basin 1 is provided with guides or reliefs 5 (FIG. 12), whereon it is possible to support one or more panels 6, which are spaced apart from the basin bottom 1/c, and on which small animals may be placed, whereby said animals would be washed and dried with difficulty if they were placed directly on the basin bottom 1/c;

Basin 1 adapted to be connected to or inserted on the basin support 11 (FIG. 15 and following figures). Said features are advantageous for the basin 1 in the following sense:

ease of use during washing and drying of the animal;

advantages from the sanitary point of view, since the liquids to be regenerated can be recovered;

advantages as regards prevention of injuries, since it is no longer necessary to lift the animal in order to place it inside the basin; and further the animal does not slip any more, since the basin has a flat bottom without rounded regions, so that the animal will be relaxed and there is no possibility that it bites. The plate or removable part 2 (FIGS. 9, 10, 11) which forms the movable part of the front wall 1/b of the basin 1, consists of a panel—like structure having projecting edges 2/a, 2/b on all but the upper side thereof, said edges allowing insertion of the panel 2 in the respective aperture obtained in the front wall of the basin 1, in such a way that the panel remains attached to it. The outside edge 2/b may project more then the edge 2/a, so as to provide a backing means against the basin body, facilitating its insertion.

The basin support (FIG. 15 and following figures) is formed with a body 11 or supporting structure consisting of two lateral uprights 11/a–11/b; a frame 11/c made up of tubular components connected to each other and to the uprights by welding; a semicircular sector 11/d forming an "L"-shaped section bar which is also integral with the frame 11/c.

The number 12 indicates the radial centrifugal compressor, which is conventional, and is fixed to the frame 11/c by means of screws; 13 designates an usual tank or can, used to suck liquids and which is inserted (not fixed) on the circular sector 11/d. The compressor 12 and the tank or can 13 connected to each other in a known manner, cooperate to form the liquid suction section, by means of which it is possible to realize the first step of the drying operation on the animal located inside the basin 1, after it has been washed and rinsed) whereas the outlet of the compressor produces a hot air jet and makes up the "hair-dryer" section.

Figure 19:
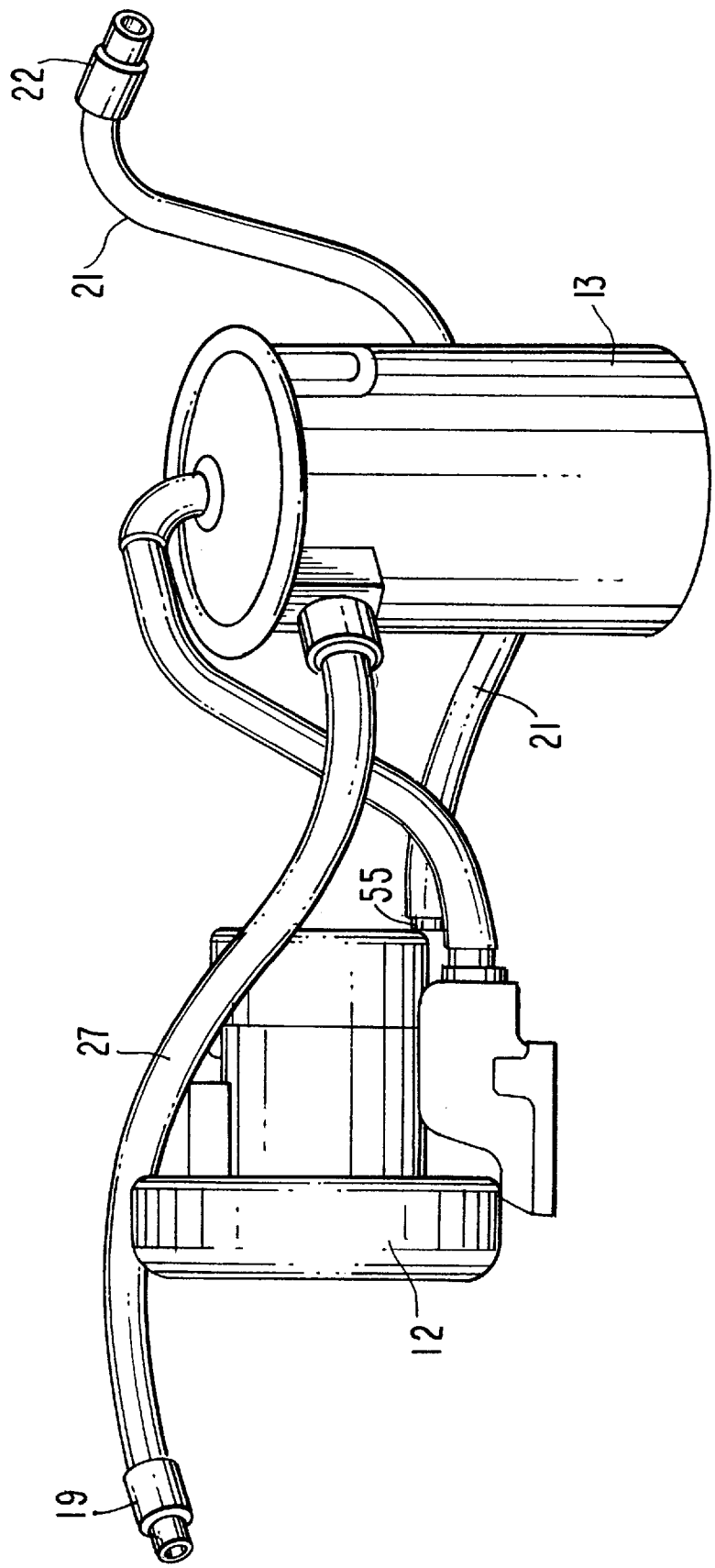
FIG. 19 shows the compressor and the tank, and the relative connecting tubes.

The assembly formed by the compressor 12, the can 13 and the tubes lodged inside the basin support, is shown in FIG. 19. The suction or intake rube 27 having an end mouth 19, is attached to the part 20/a of a sleeve integral with the body 11 (FIG. 17). Outside, on the part 20/b of said sleeve, another tube (not shown) is attached thereto, which ends into a known hose used to suck liquids. The blowing tube 21, extending from the blowing outlet 55 of the compressor 12, ends into a mouth 22 which is connected to the part 23/a of a second sleeve integral with the body 11, whereas on the part 23/b, a tube 28 is attached, ending up into a frusto-conical hose which is used as a "hair-dryer" (FIG. 20).

All mentioned tubes are flexible tubes. The construction of a basin for washing animals, with a basin support incorporating a device having a liquid suction and a hair-drying function, is an absolutely novel idea.

The basin support further includes:

a magnetothermic starter 15 to start the motor of the compressor 12;

a front door or cover 16, which is easily disassembled (or which is anyway openable) in order to facilitate removal of the can 13 for its daily emptying and for maintenance operations;

possible drawers 17 which contain combs, brushes, etc.

a rear closure panel 18.

Figure 8:
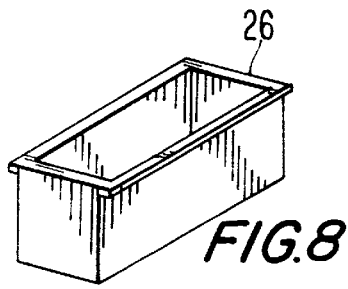
FIG. 8 is a perspective view of a small vessel to be introduced inside the sump chamber, instead of the small filtration basket of FIG. 7.

The inner space of the basin support also has the function of enclosing and hiding from the outside, the discharge duct of the basin 1 and its corresponding drain-trap, or anything else may be applied thereon, allowing to perform maintenance on these parts, for example a three-way valve used to separate polluted liquids from non-polluted ones, or possibly a container for collecting polluted liquids. Obviously the invention is not limited to the constructive details which have been illustrated and/or described herein, but it comprises also all those variants and equivalent embodiments which are realized starting from the present inventive concept, as for instance:

in the discharge duct of the basin sump, upstream of the drain-trap, there may be inserted a fluid flow deflector or the three way valve generally indicated as 70, which may be operated manually, automatically or semiautomatically, having the function of deflecting the non-polluted liquids towards the sewer or of deflecting polluted liquids towards an appropriate sump or container, avoiding the use of the vessel of FIG. 8. For example, as is known in the art, under a automatic mode, when the parasite killing substance is used and is contained in a container attached to a wall, the faucet of this container is electronically connected to the three-way valve 70,- which in this case is a solenoid valve-, so that when opening the faucet the valve automatically makes the toxic liquids flow into a container, instead to the sewer.

it is possible to associate to the basin, according to the known art.

a faucet set provided with a hot/cold water mixer, and a small shower comprising a flexible tube; or lateral support planes 8—FIG. 1, or a collection tank for polluted liquids, including an overflow detector and a signaling device indicating that a predetermined level has been reached; or at last, a coin box for a timed operation of the compressor;

it is possible to introduce two separate known devices inside the basin support, in order to obtain the liquid suction and hair-dryer operation.

We claim:

1. A basin for washing, rinsing and drying pets comprising:

a plurality of walls and a flat basin bottom forming an enclosure substantially without rounded connection regions therebetween;

a portion of at least one of the walls being removable from the at least one of walls;

panels disposed between the walls providing a support for smaller pets thereon;

a basin support, water removal means, disposed within said basin support, for sucking water from the fur of a pet supported on said panels and for providing a hot air jet within the walls for drying the pet supported on the panel;

a well mounted on the basin for receiving a discharge of liquids, separation means communicating with said well for separating toxic liquids from non-toxic liquids which are disposed within said well or downstream thereof.

2. A basin according to claim 1, further comprising a can, a pierced small basket disposed within said well to filter hair or other solid impurities from the discharge of liquids, said separation means including a three way valve for draining the liquid towards an appropriate container or sewer, said well having a sleeve, the three way valve being mounted on the sleeve of the well and being one of manually operable, semi-automatic or automatic;

said means for sucking water including a centrifugal radial compressor and tank for containing water or other impurities sucked from the pet, a suction hose, a first part connecting the compressor and the can to the support through the suction hose to provide a liquid suction operation for removing water, hair and dead parasites from the fur of the pet; and a flexible tube; a second part connecting the compressor to the base and support through the flexible tube to provide a hot air jet produced by the compressor for drying the fur of the pet; and electrical control means for controlling said compressor.

3. The basin of claim 2, wherein said flexible tube extends into a frusto-conical hose.

4. The basin according to claim 1, further comprising a small vessel disposed within the well, said small vessel retaining toxic liquids therein.

* * * * *